United States Patent
Christensen

(10) Patent No.: US 7,292,933 B2
(45) Date of Patent: Nov. 6, 2007

(54) ENGINE MISFIRE DETECTION

(75) Inventor: James R. Christensen, Whitmore Lake, MI (US)

(73) Assignee: Lotus Engineering, Inc., Ann Arbor, MI (US)

( * ) Notice: Subject to any disclaimer, the term of this patent is extended or adjusted under 35 U.S.C. 154(b) by 150 days.

(21) Appl. No.: 11/264,246

(22) Filed: Nov. 1, 2005

(65) Prior Publication Data

US 2006/0101902 A1 May 18, 2006

Related U.S. Application Data

(60) Provisional application No. 60/628,334, filed on Nov. 15, 2004.

(51) Int. Cl.
*F02D 41/00* (2006.01)
*G01M 15/00* (2006.01)
*G21C 17/00* (2006.01)

(52) U.S. Cl. .................. 701/111; 73/116; 73/117.3; 702/183

(58) Field of Classification Search ............ 701/103, 701/104, 107, 111, 114; 702/183; 73/116, 73/117.3
See application file for complete search history.

(56) References Cited

U.S. PATENT DOCUMENTS

| | | | |
|---|---|---|---|
| 4,520,449 A * | 5/1985 | Johnson et al. | 702/96 |
| 5,200,899 A | 4/1993 | Ribbens et al. | 364/431.08 |
| 5,394,330 A | 2/1995 | Horner | 364/431.03 |
| 5,415,028 A | 5/1995 | Nishimura et al. | 73/117.3 |
| 5,487,008 A | 1/1996 | Ribbens et al. | 364/431.04 |
| 5,495,415 A | 2/1996 | Ribbens et al. | 364/431.08 |
| 5,515,281 A | 5/1996 | Palazzetti et al. | 364/431.08 |
| 5,576,963 A | 11/1996 | Ribbens et al. | 364/431.08 |
| 5,678,520 A | 10/1997 | Hori et al. | 123/419 |
| 5,717,133 A | 2/1998 | Wu et al. | 73/116 |
| 5,747,681 A | 5/1998 | Kuroda et al. | 73/117.3 |
| 5,752,213 A | 5/1998 | Bryant et al. | 701/111 |
| 5,804,711 A | 9/1998 | Remboski et al. | 73/117.2 |
| 5,821,411 A | 10/1998 | Lohmann et al. | 73/116 |
| 5,841,025 A | 11/1998 | Remboski et al. | 73/117.3 |
| 5,862,506 A | 1/1999 | Lynch et al. | 701/111 |
| 5,893,042 A | 4/1999 | Lohmann et al. | 701/111 |
| 5,996,337 A * | 12/1999 | Blosser et al. | 60/274 |
| 6,021,758 A | 2/2000 | Carey et al. | 123/436 |
| 6,357,287 B1 | 3/2002 | Jin | 73/117.3 |
| 2003/0089338 A1 | 5/2003 | Remele et al. | 123/436 |

* cited by examiner

*Primary Examiner*—Stephen K. Cronin
*Assistant Examiner*—Johnny H. Hoang
(74) *Attorney, Agent, or Firm*—Gifford, Krass, Sprinkle, Anderson & Citkowski, P.C.

(57) ABSTRACT

A method of detecting an engine malfunction such as a misfire includes determining engine speed values at each of a plurality of measurement angular positions, heterodyning the engine speed values with sine and cosine functions indexed in the angular domain, passing the heterodyned results through a low pass filter, and computing the resulting magnitude from the resulting two vectors. An apparatus for detecting an engine malfunction, such as a misfire, includes an engine speed analyzer, a multiplier, and a low pass filter.

16 Claims, 6 Drawing Sheets

ENGINE MISFIRE DETECTION

REFERENCE TO RELATED APPLICATION

This application claims priority of U.S. Provisional Patent Application Ser. No. 60/628,334, filed Nov. 15, 2004, the entire content of which is incorporated herein by reference.

FIELD OF THE INVENTION

The invention relates to engine diagnostic apparatus and methods, in particular, to engine misfire detection.

BACKGROUND OF THE INVENTION

Engine misfire leads to degradation in engine performance. Furthermore, it can lead to unburned fuel leaving the engine in exhaust gases. A catalytic converter is often provided to reduce the amount of pollutants in exhaust gases, and part of the function of the catalytic converter is to induce combustion of unburned fuels on a surface of the catalytic converter. Hence, if appreciable amounts of unburned fuel are present in the exhaust gases, the catalytic converter will overheat, and can be rapidly destroyed.

Hence, it would be desirable to provide improved engine misfire detection methods and corresponding apparatus.

SUMMARY OF THE INVENTION

A method of detecting an engine malfunction such as a misfire includes determining engine speed values at each of a plurality of measurement angular positions, heterodyning the engine speed values with sine and cosine functions indexed in the angular domain, and passing the heterodyned values through a low pass filter. An apparatus for detecting an engine malfunction, such as a misfire, includes an engine speed analyzer, a multiplier, and a low pass filter.

DETAILED DESCRIPTION OF THE INVENTION

Figure 1:
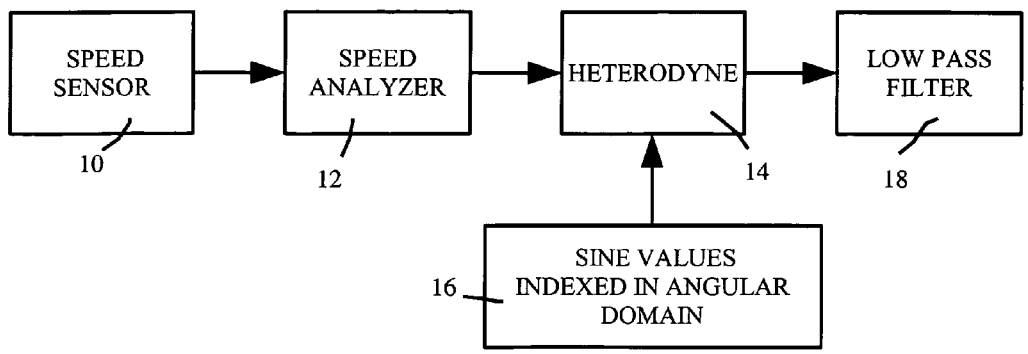
FIG. 1 is a schematic of an apparatus according to the present invention.

In a conventional four-stroke multi-cylinder engine, any given cylinder fires once every two revolutions of the engine. A single cylinder misfire in any multi-cylinder engine causes a strong half-order engine speed variation (also called a torsional velocity signature), which can be detected as part of an improved engine management system. Hence, the half order (and sometimes the first order) torsional vibration magnitude is a strong indicator of engine misfire.

First order analysis can be useful for engines with certain type of ignition systems where cylinders are paired on a common ignition coil, as a pair of cylinders misfiring 360 degrees apart generates a strong first order signature.

In this application, terms such as "first-order," "half-order," etc. relate to torsional vibrations at multiples of engine speed. A first-order signal repeats once per engine revolution, and a half-order signal repeats once per two engine revolutions. The term "engine speed" refers to the rotational speed of an engine crank shaft, or equivalent rotating engine member, which can be measured in revolutions per minute (rpm) or other convenient unit. The term "speed sensor" is used to refer to a sensor providing a signal correlated with engine speed. The term "angle" refers to rotation angles of the engine. One engine revolution corresponds to 360 degrees, and, for example, an angular interval or angle of 90 degrees corresponds to one quarter of a revolution.

Improved detection of half-order engine speed variations allows a single cylinder misfire to be rapidly detected, allowing engine management steps to be taken so as to reduce damage to a catalytic converter. Discrete angular domain sampling offers major computational advantages in comparison to discrete time sampling. Further, using a first order IIR (infinite impulse response) filter instead of the numerical integration used in conventional convolution algorithms offers further computational advantages with very little loss of accuracy.

In modern automobiles, it is common for a coil to feed opposed pairs of cylinders. A misfire in opposing cylinder pairs in an engine with an even number of cylinders and four or more cylinders causes a strong first-order engine speed variation. Hence, a coil failure can be detected from detection of a first-order variation.

A vehicle engine commonly has a speed sensor, typically providing a train of pulses as the engine rotates, with a predetermined number of pulses per revolution. In a common configuration, a toothed wheel rotates with the engine, and a pulse is produced every tooth. Hence, if there are N teeth on the rotating wheel, one revolution of the engine generates N pulses.

In examples of the present invention, in order to detect both half-order and first order signals, three or more measurements of engine speed per engine revolution are detected. As a consequence of the Nyquist sampling theorem, the minimum number of engine speed values determined per engine revolution is preferably greater than twice the order of interest. If there are more than the minimum needed pulses per revolution, the pulse train can be passed through a pulse frequency divider (also called a pulse prescaler) so as to provide a reduced number of pulses every revolution. For half-order signals, at least three engine speed values per two revolutions are used.

The elapsed time between two successive pulses within a train of pulses can be divided into a constant to obtain an engine speed value. In other words, S=C/T, where S is the engine speed value, T is the elapsed time between pulses, and C is a constant related to the angle between adjacent teeth and the units used for the engine speed. For example, engine speed can be measured in revolutions per minute (rpm), radians per second, or other convenient units. However, for misfire detection according to the present invention, the units used are not important as the misfire detection is sensitive to relative changes in the engine speed.

Hence, a new engine speed value can be obtained every time a new pulse is received from the speed sensor, by determining the engine speed from the elapsed time from the previous pulse.

If no division of the pulse train is used, a single pulse is obtained from every tooth on the rotating wheel. However, the number of teeth per sample can be varied, without affecting the successful operation of the misfire detection. A pulse prescaler can be used to divide the pulse train by some factor, if desired.

An engine speed analyzer receives a train of pulses from, for example, a flywheel having a number of teeth distributed around the periphery of the flywheel, and calculates an engine speed value as proportional to the reciprocal of the time between the pulses. A faster pulse train corresponds to a reduced time between successive pulses, and hence corresponds to a higher engine speed. The engine speed analyzer may effectively function as a pulse train to frequency converter.

Frequency components within the successively determined engine speed values can be found by multiplying, or heterodyning, the engine speed values with a sinusoid (or sine function) having a frequency of the order of interest, then determining a non-zero offset in the resulting multiplied signal. For example, the sinusoid may have a period of 360 crankshaft degrees for first order detection or 720 crankshaft degrees for half order detection. The d.c. component (offset) can then be found by passing the multiplied signal through a low pass filter.

For a two-stroke engine, first order engine speed variations are generally of interest. Engine speed variations at the effective combustion frequency may be determined.

FIG. 1 shows a schematic of an apparatus according to an example of the present invention comprising a speed sensor 10, providing pulses at periodic angular intervals as the engine rotates, an engine speed analyzer 12, a heterodyne stage (for example, a multiplier) 14, a sine value provider 16, and a low pass filter 18.

In this example, the speed sensor 10 provides a stream of pulses, there being a fixed number of pulses (N) per engine revolution. N is greater than or equal to three, as discussed above, for first order detection. The engine speed analyzer receives the train of pulses, and provides engine speed values based on the time interval between successive pulses. The sine value provider 16 provides values of a sine function, the sine function having a period equal to half, one, or two engine revolutions for half, first or second order, respectively. The sine function values are correlated with the angular positions at which speed values are determined by the engine speed analyzer. To reduce computational burdens, a pre-computed table of sine functions can be used in the manner of a look-up table.

One advantage of this approach over conventional approaches is that the heterodyne stage (or multiplier) effectively works in the angular domain. Conventional systems normally use a time domain sampling, where the engine speed is determined every fixed period of time. The current approach is more computationally efficient, as the sampling of engine speed increases as the engine speed increases, and the engine speed can be recalculated at the time a new pulse is received by the engine speed analyzer 12.

The multiplied signal, from heterodyne stage (or multiplier) 14, is provided to the low pass filter 18. This may use an algorithm such as described below, approximating a convolution function where the low-pass filter is substituted for an integrator and sampling is done in the angular instead of the time domain. In the example of a perfectly running engine, the engine speed is constant, hence the multiplication by the heterodyne stage 14 provides a perfect sinusoid to the low pass filter. In this example the low pass filter provides an output of zero, as the sinusoid averages to zero, and does not have any offset component.

Half-order engine speed variations are detected by multiplying engine speed values by a half-order sinusoid and sending the multiplied signal to a low pass filter. The multiplied signal is a sinusoid distorted by engine speed variations, and these distortions cause the low-passed multiplied signal to be non-zero. Hence, by multiplying the engine speed values by a half-order sinusoid, and determining a long term average of the resulting multiplied signal, a single engine misfire can be detected.

Engine speed values are multiplied by sine and cosine (or imaginary and real) values, and the magnitude of engine speed variations is determined from the low-passed multiplied sine and cosine signals (as described elsewhere, for example in relation to FIG. 4), and compared with a threshold value. An improved approach with computational efficiency advantages is described below.

Figure 2:
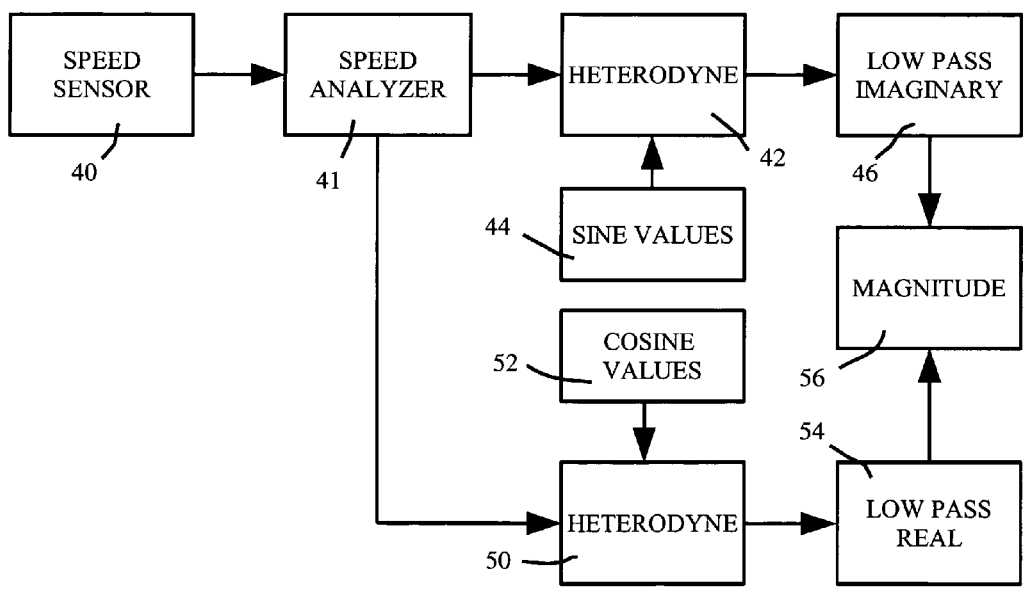
FIG. 2 is a schematic showing determination of first-order signals.

FIG. 2 shows a schematic of an apparatus according to an example of the present invention, in which a pulse train from a speed sensor 40 is received by engine speed analyzer 41, and engine speed values provided by the engine speed analyzer to both first heterodyne stage (or first multiplier) 42 and second heterodyne stage (or second multiplier) 50.

The first heterodyne stage 42 multiplies the engine speed value by a sine value, provided by sine value provider 44, and passes the sine multiplied signal (or imaginary component of the engine speed variation) to first low pass filter 46. The second heterodyne stage 50 multiplies the engine speed value by a cosine value, provided by cosine value provider 52, and passes the cosine multiplied signal (or real component of engine speed variation) to the second low pass filter 54. Unlike conventional systems, the sine and cosine tables are indexed in the angular domain, as a function of crank shaft angle. Engine speed sampling is also performed in the angular domain, for example at periodic angular intervals as the crank shaft rotates.

The first low-passed signal provided by first low pass filter 46, and second low-passed signal provided by second low pass filter 54, are combined in magnitude calculator 56.

The magnitude calculator 56 determines the magnitude of engine speed variations from a combination of squared values of first and second low-passed values, as discussed below in relation to FIG. 4.

In the schematic of FIG. 2, half-order signatures can be detected, if the sine function and cosine function both have a period equal to two revolutions or 720 crankshaft degrees.

The magnitude of the combined signal is used to detect the presence of a single cylinder misfire. The magnitude of the combined signal is compared with a threshold value, and if the magnitude is greater than the threshold value, engine management steps are taken to either correct the misfire, protect the catalytic converter from destruction, or otherwise improve engine performance. Engine management steps may include providing a signal indicating a problem, shutting down the engine, or other steps.

Figure 3:
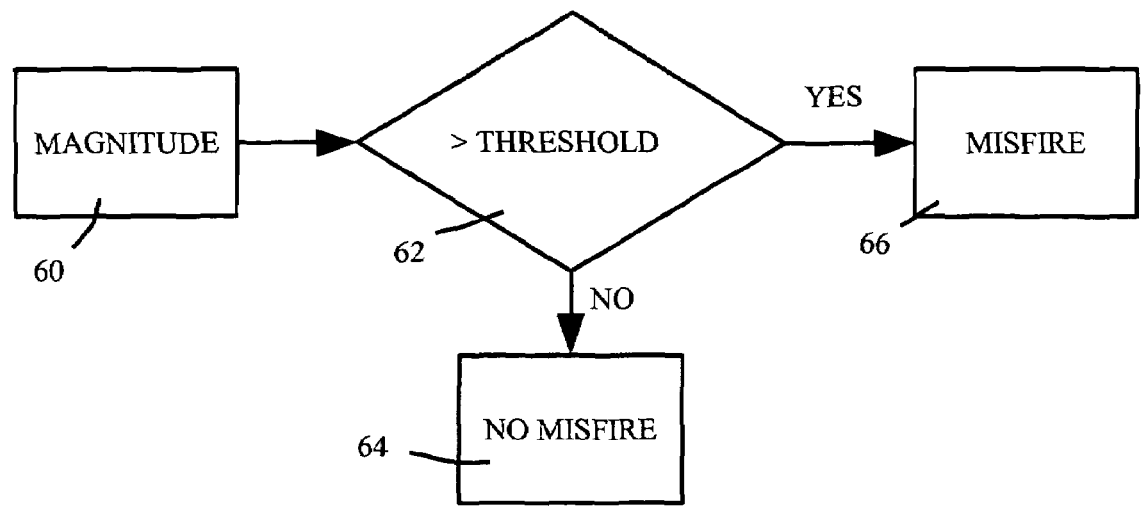
FIG. 3 is a schematic illustrating determination of a misfire by comparison to a threshold value.

FIG. 3 shows a schematic of a misfire detection method. Box 60 corresponds to calculation of a low pass filtered signal correlated with engine speed variations at a half (or first) order. Box 62 corresponds to a comparison of the signal with a threshold value. If the signal is greater than the threshold, box 66 corresponds to detection of a misfire, with associated engine management steps such as disconnecting a misfiring cylinder. If the signal is less than the threshold value, box 64 corresponds to no detection of a misfire, and correspondingly taking no engine management steps.

Determination of the threshold value, and possible engine management steps, are described in more detail below.

Figure 4:
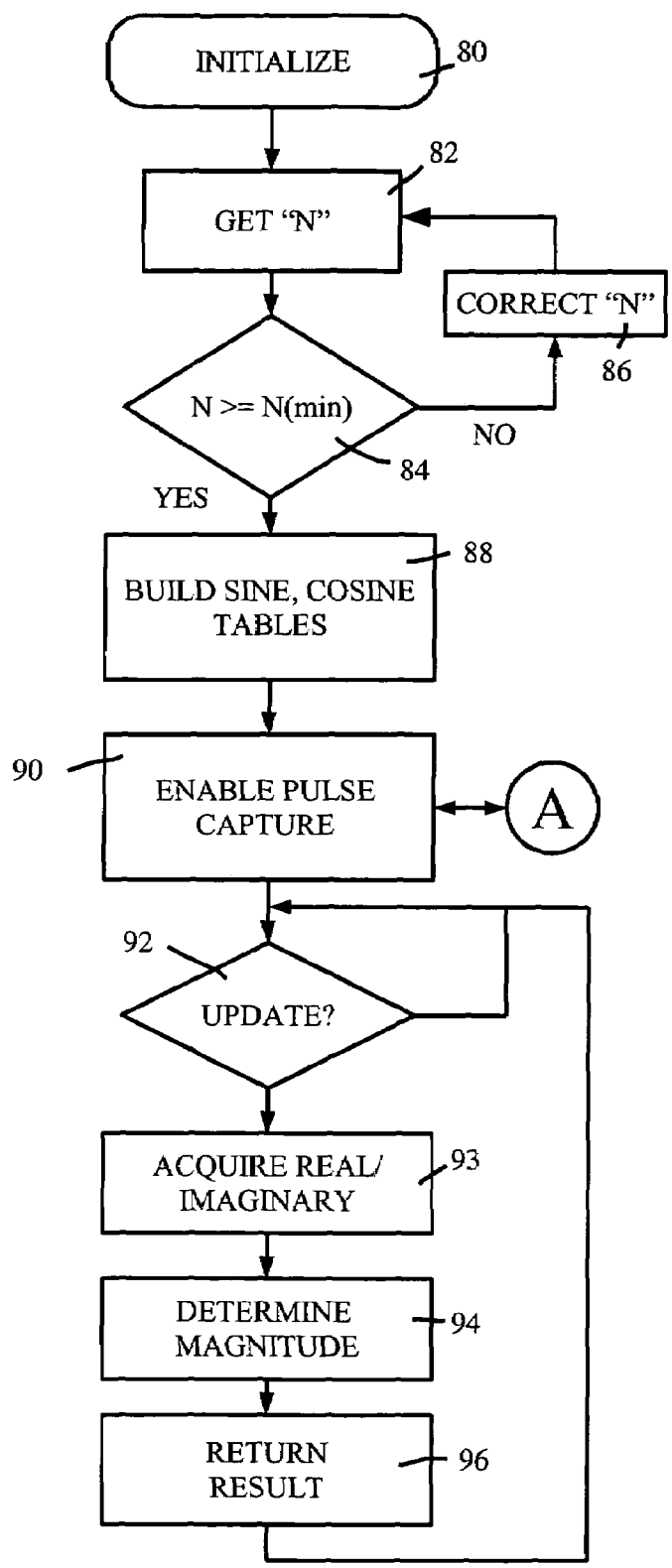
FIG. 4 is a flowchart illustrating operation of a computer program, the computer programming running on an apparatus according to the present invention.

FIG. 4 shows a schematic of a method according to the present invention, which in this example is achieved using a software program executable by a processor within an apparatus according to the present invention. Box 80 corresponds to initializing the apparatus. Box 82 corresponds to obtaining the number of pulses per engine revolution from initialization data, N, as received from a speed sensor. Box 84 corresponds to checking that N is greater than or equal to a minimum value. For example, three speed samples per engine revolution may be used for first order engine speed fluctuation detection. Box 86 corresponds to providing a prompt for a correction if N is less than the required minimum value.

Box 88 corresponds to generating sine and cosine tables of size 2N each. For computational simplicity, the tables can be fixed point, signed, and short sized in format. However, this is not essential. A short loop, for n=0 to n=2N−1, can be used to provide pre-calculated values of sine and cosine for each N for use in a lookup table. A tooth event prescaler can be adjusted to give a desired number of tooth events per revolution. This is an optional step, and the number of tooth events per revolution can be set to any convenient number greater than or equal to that needed. Experiments were performed with four tooth events per revolution, corresponding to four determinations of engine speed per revolution.

For example, a loop of the following form can be used:
FOR n=0 to n=2N−1
Sine [n]=:(short)(sin(n/(2N)*2PI)*32767.0)
Cos [n]=:(short)(cos(n/(2N)*2PI)*32767.0)
NEXT Box 90 corresponds to enabling a pulse event capture, corresponding to receiving of a pulse from the speed sensor. At this point, illustrated by the circle labeled 'A', the algorithm described below in relation to FIG. 5, or similar algorithm, is executed, returning values related to engine speed variations at the order(s) of interest, such as those discussed below in relation to Box 110 of FIG. 5.

Box 92 corresponds to a host request order update. This relates to an optional implementation, in which parallel processors, or threads on a single processor system, are used. A first processor or thread monitors data in real time, and a second processor or thread computes magnitude of speed variations, detects misfires, and requests updated data at intervals from the first processor. The update can be asynchronous with crank shaft position. For example, the second processor can execute a software program as described in relation to FIG. 4, and the first processor can execute a software program including an algorithm as described in relation to FIG. 5 below.

Box 93 corresponds to determination of the real (cosine multiplied) and imaginary (sine multiplied) components of the engine speed variation at the order of interest.

Box 94 corresponds to computation of the magnitude of the engine speed variation at an order of interest. For example, the magnitude of the half-order speed variation can be calculated as the square root of the sum of the sine multiplied signal squared and the cosine multiplied signal squared, both signals being squared after being passed through a low pass filter. For example:

Magnitude[order #]=(Real[order #]$^2$+Img[order #]$^2$)$^{0.5}$

Here, the terms real and imaginary are used for vector components of the engine speed variation, and these correspond to cosine and sine multiplied signals, respectively. The term "order #" relates to speed variations at a particular order number. The final square root is optional, as a comparison can be made between the sum of squared components with a threshold value that is related to the square of an engine speed variation. The mean square, root mean square, or similar, may also be determined and compared with a threshold value. The magnitude of any order engine speed variation of interest, for example half-order, first-order signal, or any other order, can be determined.

The computation of magnitude can be a continuous process which results in one new real and imaginary component for each order computed every time velocity is sampled. The real and imaginary component values may be read asynchronously to the sampling process and combined to compute a magnitude for each order separately or in combination.

Box 96 corresponds to returning the results to the host. At this point if the magnitudes are greater than predetermined thresholds, engine management adjustments can be carried out. Misfire is detected by comparing the magnitude of each order to a threshold (for example, a predetermined constant), and if the magnitude is greater than the threshold the misfire is suspected.

Figure 5:
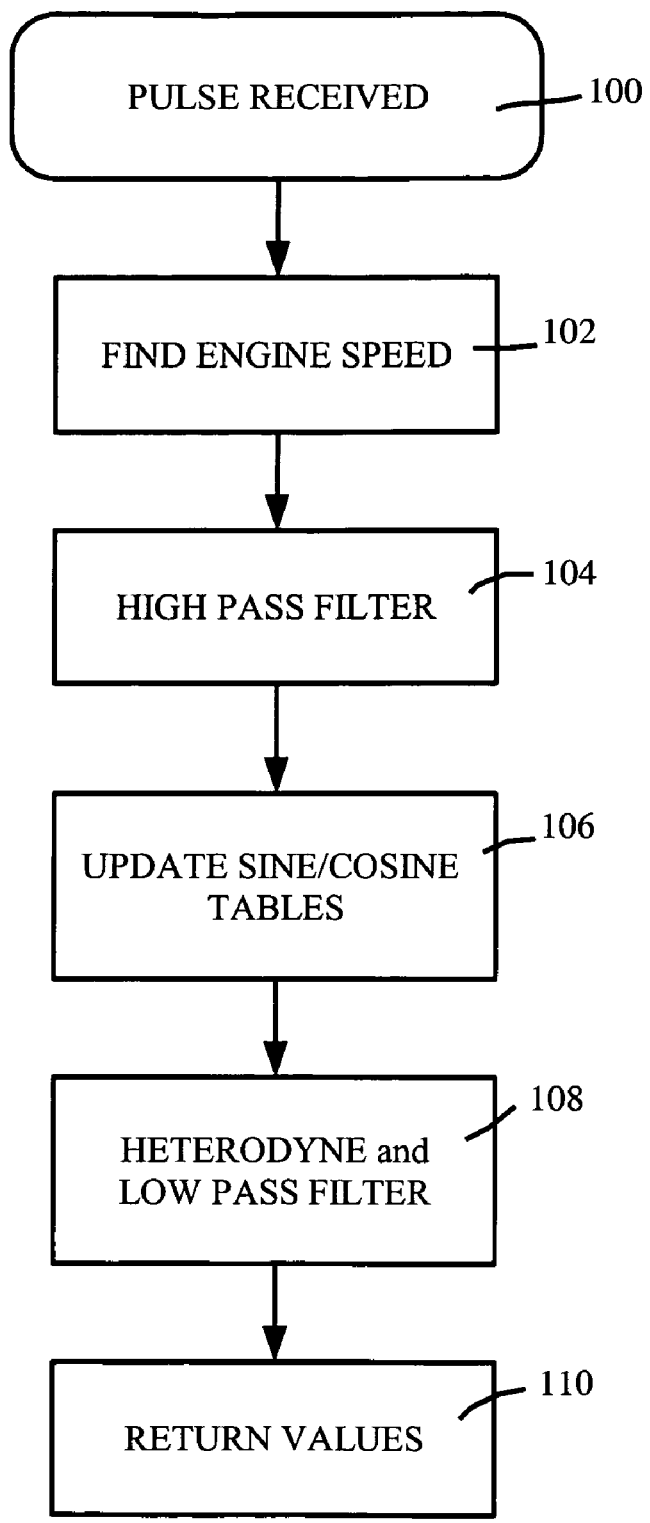
FIG. 5 illustrates operation of a subroutine.

FIG. 5 is a schematic illustrating the operation of an algorithm, the algorithm being triggered by receipt of a pulse from the speed sensor.

Box 100 corresponds to receipt of a pulse from a speed sensor. This may also be referred to as a tooth event, as the speed sensor, in many examples, may comprise a toothed wheel providing a pulse each time a tooth passes a tooth sensor.

Box 102 corresponds to operation of the engine speed analyzer, in this case carried out by software running on a processor. The engine speed is calculated by dividing a constant by the elapsed time since the last tooth event. One approach is:
Count=Read Tooth Count since last interrupt from hardware
Time=Read Elasped Time in microseconds since the last interrupt from hardware
Speed=(60*1.0e6)*Count/(N*Time).

In this example, the Count variable is effectively a prescaling factor. In some examples, a speed sensor provides an excess number of pulses per engine revolution, and a pulse prescaler divides the frequency of the unscaled pulse train by a value equal to count to provide a desired number of pulses per revolution.

Box 104 corresponds to passing the speed signal through a high pass filter.

In one example, the following approach was used:
HiPassSpeed[n]=Speed[n]−LowPassSpeed[n]
and LowPassSpeed[n]=(Speed[n]−LowPassSpeed[n−1])/k+LowPassSpeed[n−1]
where n is the sample index, and k is an IIR (infinite impulse response) filter coefficient. A value of 32 was used for k. IR equations are updated once per speed sample and their bandwidth is proportional to engine speed. The low pass filter output was used only to monitor correct operation of the algorithm, and can be discarded.

$Fo_{-3db}$=Speed(rad/sec)*4/(2pi)  (samples/revolution)/k;
where k=32

In this example, the filter cutoff frequencies of HiPassSpeed and LowPassSpeed are 2.0% of engine speed in rad/sec. However, other percentages can be used.

The high pass filter removes the mean speed, leaving only deviations around the mean. This is computationally advantageous, as the subsequent heterodyning step then uses smaller speed values. For example, engine speed variations may be ±50 rpm around a mean of 5000 rpm. It is computationally more efficient, requiring fewer bits, to handle engine speed values around 50 than engine speed values around 5000. However, this step is optional.

Engine speed is effectively determined as an average value over regular angular intervals. The use of sampling in the angular domain inherently provides a comb filter, removing higher harmonics at multiples of the sampling frequency. No additional anti-aliasing filter is required.

Box 106 corresponds to updating the sine and cosine table values. In one example, the following approach was used:

Index[HALF]=Index[HALF]+Count if Index[HALF]>=2N then Index[HALF]=Index[HALF]−2N Index[FIRST]=Index[FIRST]+Count if Index [FIRST]>=2N then Index[FIRST]=Index[FIRST]−2N Box 108 corresponds to heterodyning (or multiplying) the high pass filtered engine speed values with the sine and cosine values. The sine and cosine table indices are updated once per speed measurement event. The resultant heterodyned signals are then passed through a first order, infinite impulse response low pass filter. The multiplication and low pass filter step approximates a convolution of the engine speed values and sine/cosine values signals, but is computationally simpler.

For example, the following approach can be used which combines the heterodyning and low pass functions:

Real[HALF]$_n$=(HiPassSpeed$_n$*Cos Table[Index$_{Half}$]−Real[HALF]$_{n-1}$)/k+Real[HALF]$_{n-1}$ Img[HALF]$_n$=(HiPassSpeed$_n$*Sin Table[Index$_{Half}$]−Img[HALF]$_{n-1}$)/k+Img[HALF]$_{n-1}$ Real[FIRST]$_n$=(HiPassSpeed$_n$*Cos Table[Index$_{First}$]−Real[FIRST]$_{n-1}$)/k+RealSeries[FIRST]$_{n-1}$ Img[FIRST]$_n$=(HiPassSpeed$_n$*Sin Table[Index$_{First}$]−Img[FIRST]$_{n-1}$)/k+Img[FIRST]$_{n-1}$ Here, the HighPassSpeed values are high-pass filtered speed values provided by Box 104. As discussed above, the high-pass filtering is optional, and actual speed values can be used instead.

Real(HALF) corresponds to cosine multiplied engine speed values, and Img(HALF) corresponds to sine multiplied engine speed values, where the cosine and sine functions having a half-order period. The use of the term "real" to refer to cosine multiplied values is conventional. Cos Table[Index$_{Half}$] corresponds to a cosine value taken from a look-up table. The subscripts n and n−1 refer to latest determined values and previous determined values, respectively.

A value of k=32 is used, so that the cut-off frequency of the order components are again 2% of the engine speed in rad/sec. However, other values can be used.

Box 110 corresponds to the return from the algorithm, in this example including four values. The four values returned correspond to the sine and cosine heterodyned speed signals at half-order and first-order frequencies, the values having being passed through a low pass filter. In other examples, the values may be squared before return, or magnitudes calculated within this algorithm.

If the angular interval of speed value sampling divides exactly into 360 degrees, the sine and cosine values can be determined for the angular intervals, and the same values repeat exactly each revolution. The situation is complicated if a prescaled pulse train gives an angular interval that is not a simple division of 360 degrees. For example, suppose a toothed wheel sensor provides 41 non-prescaled pulses per revolution, and a prescaling value of 10 is used to provide just over 4 pulses per revolution. For first order measurements, 41 values of sine and cosine are precalculated. For half-order measurements, 82 values of sine and cosine values are precalculated (corresponding to two revolutions of the engine). The Count value (see above) can be used to keep track of engine angular position, for example using modulo-N arithmetic to determine which values from the tables are used in the multiplication step.

Figure 6:
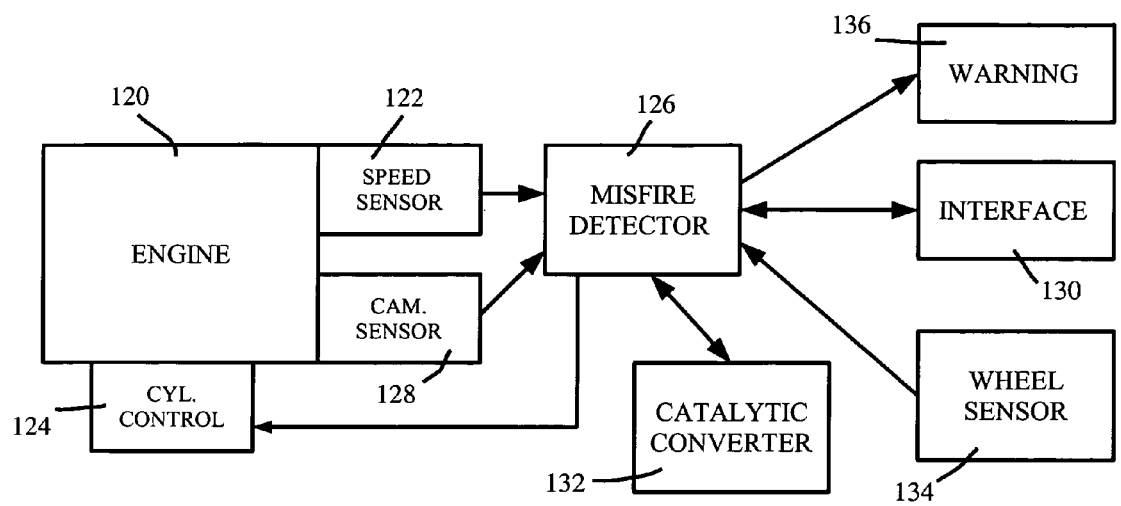
FIG. 6 is a schematic of an engine management system including a misfire detector.

FIG. 6 shows a schematic of an engine management system according to the present invention. The system comprises engine 120, speed sensor 122, cylinder controller 124, misfire detector 126, camshaft sensor 128, operator interface 130, catalytic converter 132, wheel speed sensor 134, and warning 136.

The figure shows engine 120 with speed sensor 122 providing a signal to a misfire detector 126. The speed sensor can be a crank shaft position sensor. The misfire detector detects an engine misfire according to the present invention, for example detecting half-order engine speed variations as described above, and provides an output corresponding to the presence or otherwise of a misfire, and also the identification of the misfiring cylinder. The latter aspect is discussed in more detail below.

In this example, the misfire detector also receives a wheel speed signal from a wheel speed sensor 134. Engine speed variations can be induced by wheel speed variations, for example due to rough road (such as potholes, dirt roads, and the like), railroad tracks, ice, or other road surface conditions, and this effectively creates noise in the engine speed values. The wheel speed signal can be used to reduce or eliminate the effect of such noise. For example, a threshold value can be raised for misfire detection, or apparent misfire detections ignored, if wheel speed variations are over a certain limit. The effect of wheel speed variations on engine speed can be also be compensated for through an additional algorithm.

If a misfire is detected, the misfire detector triggers an engine light or other warning 136, which may be accompanied by an audible alert to the driver. A visible, acoustic, and/or haptic warning can be provided to the vehicle operator using warning 136.

The misfire detector may also receive temperature signals from a catalyst temperature sensor within the catalytic converter 132, and may provide signals so as to protect the catalytic converter in the event of a persistent misfire. For example, air, nitrogen, or other gas may be directed over the catalyst surface using a catalyst protection system associated with the catalytic converter. The misfire detector also receives a signal from a camshaft sensor 128. The camshaft sensor facilitates identification of the misfiring cylinder.

The misfire detector sends a signal to cylinder controller 124 associated with the misfiring cylinder, which may disable this cylinder. This may lead to a degradation of engine performance, but protects the catalytic converter from rapid destruction or degradation.

An operator interface 130 allows an operator to initialize the misfire detector, and to monitor information provided by the misfire detector. For example, the operator interface may allow an engine operator to set the threshold value. The engine operator may also view the level of engine speed variation signatures in the output of the misfire detector, for example to monitor the quality of engine performance.

Examples of the present invention may also detect other engine malfunctions which lead to engine speed variations.

Figure 7:
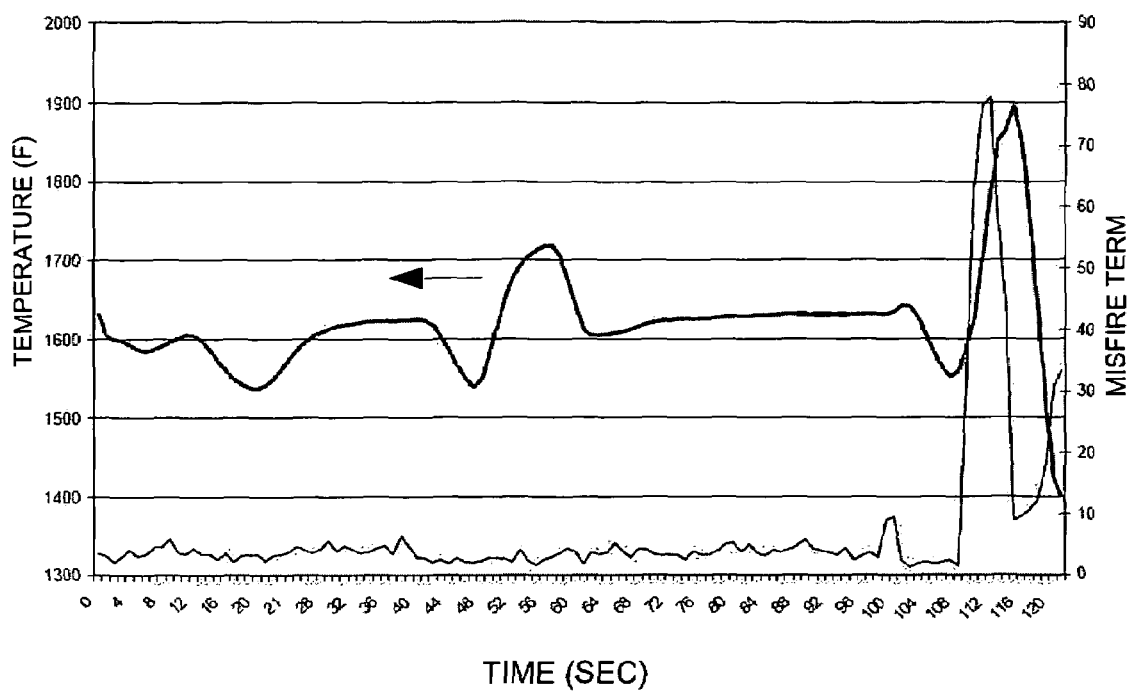
FIG. 7 illustrates catalyst temperature and output from a misfire detector after a misfire occurs, all cylinders continuing to run.

FIG. 7 illustrates catalyst temperature and output from a misfire detector, as a function of time, with the engine continuing to misfire after the first detection occurs. Before misfire, the catalyst temperature remains at approximately 1600° F., but after misfire the catalyst temperature rapidly increases towards 1900° F. The engine speed variation at first order in rpm, the misfire term, is the lower curve on the left of the figure, but increases by a factor of approximately forty after misfire occurs. The baseline level is approximately 4 rpm, allowing a threshold value to be set, for example, at 10-20 rpm. After misfire, the misfire term approaches 80.

Figure 8:
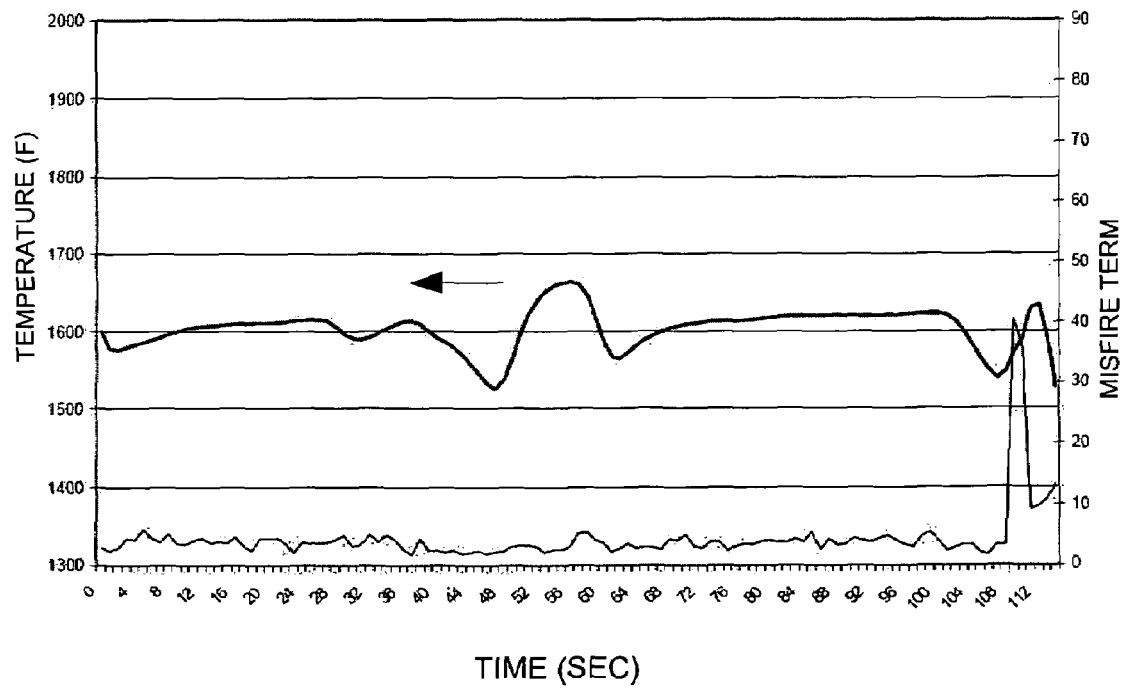
FIG. 8 illustrates catalyst temperature and output from a misfire detector after a misfire occurs, the misfiring cylinder being disabled after misfire is detected.

FIG. 8 shows a similar situation to that of FIG. 7, but in this case the misfiring cylinder is disabled soon after the misfire is detected. In this case the rise in catalyst temperature is within typical fluctuations, and there is no risk of damage to the catalytic converter.

The disablement of the misfiring figure can be achieved automatically if the misfire term, as discussed above in relation to FIG. 7, goes above a threshold value.

Computational Efficiency

A full Discrete Fourier Transform (DFT) or Fast Fourier Transform (FFT) is unnecessary and computationally wasteful in connection with the present misfire detection approach. A traditional DFT computation requires 4*N multiply and accumulates per order to update the computation of each order. If one update per sample is desired, the 4N multiply and accumulate steps can be done for each sample with data stored in a first-in, first-out buffer. Then the buffer contents can be integrated to complete the convolution. Traditional DFTs also sample at fixed time intervals, which requires interpolation to convert data which was acquired at fixed angular intervals. This interpolation process requires sine and cosine coefficients required for DFT computations to be done in real time.

In contrast, the present approach allows sine and cosine values to be pre-calculated, increasing computational efficiency. Also, the multiplication step is done at fixed angular intervals, rather than at fixed time intervals. This both simplifies the computation, and provides increased accuracy.

The integration required in a DFT is also a FIR (finite impulse response) low pass filter with a rectangular sampling window. As an alternative, a first order IIR (infinite impulse response) filter may be used, and the algorithm can be updated every sample point with only 2 multiplies per order. An efficient IIR filter can then be implemented using shift and add techniques.

Hence, if a partial DFT is computed in the angular displacement domain (rather than the time domain), no complicated interpolation process is required and if a low-pass filter is used, no integration is required. The engine speed variation is repetitive in the angular displacement domain as well as the time domain. In other words, the sample window maybe computed over 2N samples over 720 degrees as well as 2N samples distributed over a time period of 2T. The results are nearly identical if the magnitude of engine speed variation is small relative to the mean engine speed. Also, sine and cosine coefficients for the DFT can be pre-computed in a lookup table, which greatly increases computational efficiency.

Examples of the present invention use integer or fixed points arithmetic, which provides efficiency advantages over floating point arithmetic. However, accuracy is degraded by a slight amount, such as one or two percent. However, since the difference between misfire and non-misfire situations is typically much greater than one percent (for example, ~1000%) this loss of accuracy does not affect the ability of the present system to reliably detect engine misfires.

An advantage over the prior art is that sine and cosine tables are indexed in the angular domain, rather than time domain, and can be precomputed. Further, an infinite impulse response filter, not a numerical integral, can be used to emulate the analog response of a low pass filter. The term "infinite" in "infinite impulse response filter" refers to the exponential decay time of the function, going to zero at infinity.

Further Discussion of Low Pass Filter

The low pass filter used in examples of the present invention uses software to emulate an analog (such as capacitive resistor) low pass filter. A shift operation in binary is used, equivalent to dividing by an order of two. As the data is already in binary, effectively the decimal point is shifted one or more positions to the left.

In examples of the present invention a new filtered value is derived by the following equation:

$$\text{New(filtered)}=[\text{New(input)}-\text{Old(filtered)}]/k+\text{Old(filtered)}$$

where New(filtered) is the new filtered value, or output of the low pass filter, New(input) is the new value at the input of the low pass filter, and Old(filtered) is the previous output filtered value. The value k should be greater than one. If k is chosen as a multiple of two, there is efficiency in computation as discussed above as a shift operation can be used to perform the division. In examples of the present invention, a value of k=32 was used.

The magnitude of engine speed variations calculated after low pass filtering is not only sensitive to exactly on-order signals, but is also responsive to close spectral components. A lower value of k means a higher value of cutoff frequency, and effectively provides a wider filter pass-band around the order of interest. A value of k can be chosen such that intermittent misfires are detected, but not such that typical noise origin data does not cause a false positive. Using a value k=32, the pass band (to −3 dB) was found to be approximately 2% of engine speed. In example laboratory tests, the value k=32 was found empirically to be responsive to engine misfires without providing false positives. However, other values of k may be chosen.

This form of software based low pass filter does not have a fixed filter pass band, and the pass band increases with engine speed. This is highly advantageous, since this means sensitivity does not vary too much with changing average engine speed.

The present invention can be executed by a software program using digital data, however other approaches combining digital and analog, or all analog approaches may be used.

A low pass filter can operate by detecting an offset or d.c. value in time-averaged results. If there is no engine speed variation, the product of engine speed and sine/cosine tables produces unmodified sine/cosine functions, which average over time to zero. When engine speed variations occur, the sine/cosine functions are modified by the multiplication process, and may no longer average to zero. The size of the offset from zero depends on the magnitude of the engine speed variations at the order of interest. The examples discussed below provide a computationally simple approach to determining engine speed variations, however other approaches can be used as will be clear to those skilled in the mathematical arts.

By measuring the mean velocity over the time period between sample points (when pulses are received from the speed sensor), a natural comb filter is formed which reduces the risk of aliasing higher orders down in to the half order and first order components of interest.

Misfire Detection and Threshold Levels

Misfire can be detected by comparing the magnitude of engine speed variations at a given order to a threshold speed variation (for example, a predetermined constant value), and if the determined speed variation is greater than the threshold speed variation, a misfire or other engine malfunction is indicated and appropriate engine management steps taken or an operator warning provided.

The threshold speed variation can be determined by idling the engine under non-misfire conditions, to determine a baseline speed variation at the order of interest. For example, the baseline speed variation at half-order for a typical idling automobile engine may be around 1-5 rpm. With one cylinder misfiring, the half-order speed variation may be 10-40 times greater than the baseline. Hence, the threshold can be set at some multiple of the baseline, but less than the increase associated with misfire. For example, the threshold may be 2-5 times the baseline level, such as twice or three times the baseline level.

The determined engine speed variations need not be in any conventional measurement units, as misfire and other engine malfunctions can be determined using comparison of relative values. However, appropriate scaling can be used to provide an engine speed variation in a human-friendly unit such as rpm. Similarly, the speed values provided by the engine speed analyzer need not be in conventional units of speed.

The large change in first-order and/or half-order engine speed variations with development of an engine misfire allows misfire detection to occur reliably, and false misfire detections are largely eliminated. False engine malfunction detections may arise from, for example, a rough road surface, or highly dynamic throttle motion as discussed further below.

If the square of engine speed variations is determined, this can be compared with a threshold value that is a similar multiple of the square of baseline engine speed variations.

Speed Sensor

Many modern automobiles are already provided with a speed sensor, hence a misfire detector according to the present invention may be configured to receive an existing speed sensor signal. A speed sensor may be, for example, a passive sensor providing one pulse per tooth of a rotating flywheel, or a Hall Effect sensor. Alternatively a pulse may be provided every M teeth, M being chosen to reduce the pulse number per revolution to some value equal to or greater than the minimum required. For example, a pulse frequency divider can be used to obtain, for example, three, four, or more pulses per revolution using a speed sensor providing a similar or greater number of pulses per revolution. The number of speed samples per revolution need not be an integer. More samples than necessary per revolution can be used, with the cost of added computational effort. A representative speed sensor is described in U.S. Pat. No. 5,717,133.

The (substantially instantaneous) engine speed values can be determined by measuring the time period between known angular displacements of the crank shaft and computing the speed value $S=C/T$ where C is a conversion constant and T is the time between the (possibly fixed) angular crankshaft displacement, for example as measured by a high resolution timer with microsecond or sub-microsecond precision.

The speed sensor may also provide an analog output, which may be sampled N times per revolution. The sampling process may include averaging an analog signal over an angular interval, such as 360/N degrees.

Multiplications may also be performed by analog circuitry, as is well known to those skilled in the electronics arts.

Cylinder Identification

The cylinder can be identified by determining the angle between real and imaginary components of the engine speed variation, the components equivalent to the cosine and sine multiplied signals respectively. A reference signal can be used to indicate cylinder number one, for example, which can be used to reset the sine and cosine tables. Sometimes, a reference signal is provided, for example by a different tooth or other additional signal from the speed sensor. Alternatively, a separate camshaft sensor can be used to provide a reference signal.

Engine Figure of Merit

An apparatus according to the present invention can also be used to determine the quality of operation of an engine, alternatively the engine figure of merit. Since this algorithm is sensitive to power imbalances between cylinders, a measurement of torsional vibration quality may be ascertained. This may be defined as the average speed variation at either half-order or first-order. A typical value is, for example, 4 rpm-peak at normal running conditions.

The invention is not restricted to the illustrative examples described above. Examples are not intended as limitations on the scope of the invention. Methods, apparatus, algorithms, and the like described herein are exemplary and not intended as limitations on the scope of the invention. In other examples, methods and components of apparatus can be combined or distributed in ways other than illustrated. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Prov. Pat. App. Ser. No. 60/628,334, filed Nov. 15, 2004, is incorporated herein by reference.

I claim:

1. A method of detecting a malfunction of an engine, the engine having a rotating member and an angular position correlated with an angular orientation of the rotating member, the engine having an engine speed, the method comprising:

determining the engine speed at a plurality of angular positions;

multiplying the engine speed by a sine function of the angular position to provide a first product;

passing the first product through a first low pass filter to produce a first output; and detecting the malfunction of the engine using the first output.

2. The method of claim 1, wherein the engine speed is determined a number of times per engine revolution, the number of times being substantially independent of engine speed.

3. The method of claim 2, wherein the engine speed is determined at least three times per engine revolution.

4. The method of claim 3, wherein the plurality of angular positions are separated by an angular interval,
the angular interval being substantially independent of engine speed.

5. The method of claim 4, further including the steps of:
multiplying the engine speed by a cosine function of the angular position to provide a second product;
passing the second product through a second low pass filter to provide a second output;
combining the first output and the second output into a magnitude term, the magnitude term being correlated with a magnitude of an engine speed variation; and
detecting the malfunction of the engine using the magnitude value.

6. The method of claim 5, wherein the engine speed variation has an angular period,
the sine function and cosine function both being a function of angular position, and both having the angular period.

7. The method of claim 5, wherein the low pass filter is a first order infinite impulse response filter.

8. The method of claim 1, wherein the sine function is stored in a look-up table.

9. The method of claim 1, wherein the engine malfunction is an engine misfire, and the sine function has an angular period equivalent to two engine revolutions.

10. The method of claim 1, wherein the engine malfunction is an engine misfire, and the sine function has an angular period equivalent to one engine revolution.

11. The method or claim 5, wherein detecting the malfunction from the magnitude of engine speed variation includes comparing the magnitude of engine speed variation with a threshold value, the malfunction being detected if the magnitude of engine speed variation is greater than or equal to the threshold value.

12. The method of claim 6, wherein the angular period is selected from a group consisting of 360 degrees, corresponding to first order, and 720 degrees, corresponding to half order.

13. The method of claim 11, wherein the threshold value is a multiple of baseline value, the baseline value being an engine speed variation for a non-misfiring engine.

14. The method of claim 13, wherein the threshold value is at least twice the baseline value.

15. The method of claim 13, wherein the threshold value is between approximately 2 and 10 times greater than the baseline value.

16. The method of claim 1, wherein the engine speed determining step comprises receiving a train of pulses from an engine speed sensor as the engine rotates and determining the engine speed from the elapsed time between pulses received from the engine speed sensor.

* * * * *